June 3, 1941.                     E. T. BURTON                          2,244,513
                    SWEEP CIRCUIT FOR CATHODE RAY OSCILLOGRAPH
                              Filed Dec. 15, 1937
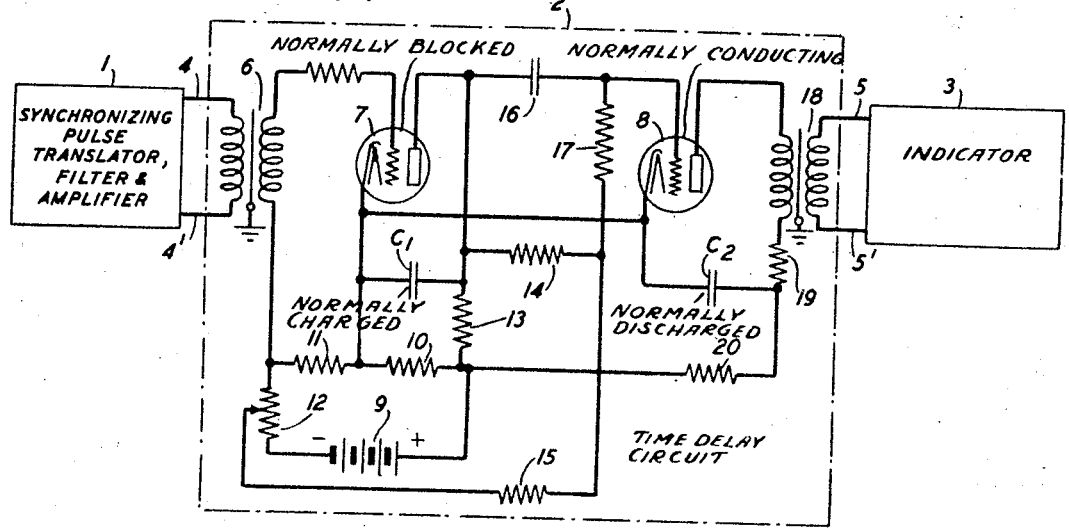
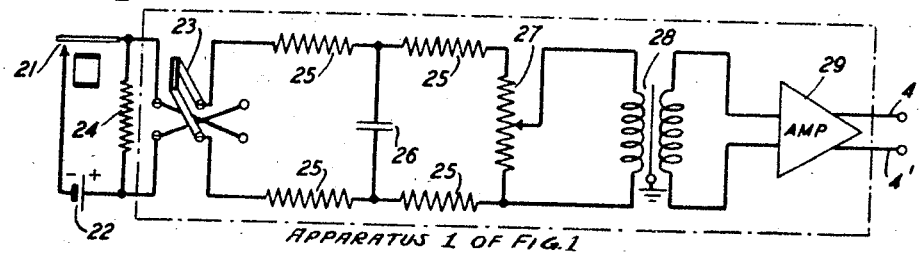
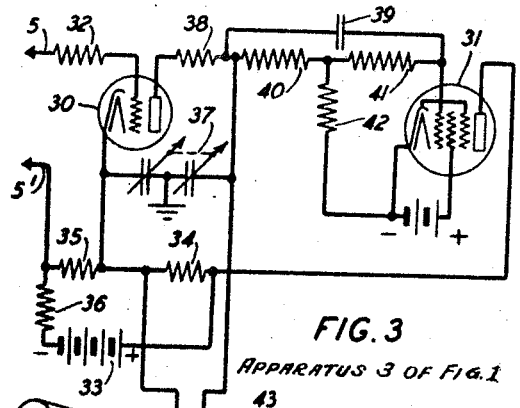
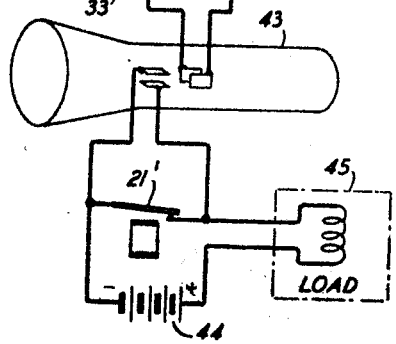
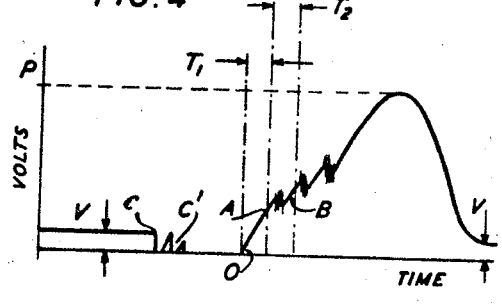
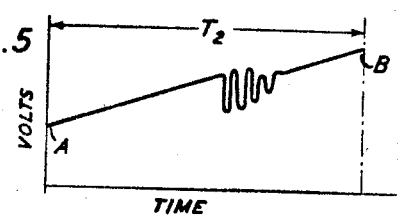
INVENTOR
E. T. BURTON
BY
ATTORNEY Patented June 3, 1941

2,244,513

UNITED STATES PATENT OFFICE 2,244,513

SWEEP CIRCUIT FOR CATHODE RAY OSCILLOGRAPH

Everett T. Burton, Millburn, N. J., assignor to Bell Telephone Laboratories, Incorporated, New York, N. Y., a corporation of New York Application December 15, 1937, Serial No. 179,872

5 Claims. (Cl. 171—95)

This invention relates to a delayed action sweep circuit for oscillographs which causes the sweep function to take place a predetermined interval of time after the beginning of a cycle of phenomenon under observation.

The general object of this invention is to provide means whereby a pulse of any nature which is translatable into an electrical pulse may be delayed in its action upon an indicating device for a predetermined and adjustable period of time.

This object is attained by this invention by providing a combination of apparatus comprising a translating, filtering and amplifying means for selecting and electrically amplifying a starting pulse associated or synchronized with the phenomenon under observation and an electrical delay circuit for electrically delaying the said starting pulse so that its control over the sweep circuit of a cathode ray oscillograph may be delayed for a predetermined and adjustable period of time.

It has ofttimes been found necessary to study the action of electrical apparatus with respect to transient conditions set up during switching or other physical effects which can be made to repeatedly trace a particular wave shape on a cathode ray screen. Some of these physical effects which obviously would lend themselves readily to the practice of this invention are the study of circuit conditions arising from switching, the study of heart action, impact studies on bridges or other structures and stress-strain investigations of materials subjected to rapidly applied unidirectional or reversing forces. Since the method would be fundamentally similar for nearly all these physical effects, the invention will be described as applied to the study of relay contacts during switching as illustrative of the several enumerated uses.

In the study of wave forms generally as well as the electrical effects of relay switching, it is frequently desirable to be able to enlarge certain definite portions for more detailed study. Where relay contact action is the object of study, the operation might be either periodic or non-periodic; the latter case applying where commercial types of signals or pulses are transmitted during the test. The range of interest might extend from battery voltages to surge peaks as high as 2000 volts or more.

Since a certain desired pattern should be repeated in substantially the same position on the oscillograph screen for successive periodic or non-periodic operation, it is necessary to synchronize the sweep circuit with the circuit associated with the relay under observation. The sweep velocity should be variable to permit either observation of a large portion of the relay operating cycle or to permit expanding the pattern so that details of a small portion can be studied.

The invention may be more fully understood as applied to the study of relay operation by referring to the accompanying drawing in which:

Fig. 1 is a circuit diagram embodying the essential electrical delay apparatus;

Fig. 2 is one form of pulse translator, filter and amplifier;

Fig. 3 is a suitable sweep control circuit associated with a cathode ray tube;

Fig. 4 is a typical form of voltage oscillogram obtained from a relay switching operation; and Fig. 5 is a portion A—B of Fig. 4 magnified along the time axis to show a portion of the oscillogram which it is desired to study more in detail.

Referring now to Fig. 1, reference numeral 1 denotes a suitable synchronizing pulse translator, filter and amplifier, one form of which will be more completely described later and which has for its purpose the function of synchronizing the starting pulse for the sweep circuit with the commencement of a phenomenon under observation. This synchronizing circuit is connected to delay circuit 2 by means of conductors 4, 4'. Delay circuit 2 is shown schematically with its essential component parts and comprises input transformer 6 which transmits the synchronizing pulse to tube 7, the grid of which is normally negative so as to block substantially all anode current. The grid of tube 8 is normally very slightly positive so as to permit a small anode current. Condenser $C_1$ is connected in the anode circuit of tube 7 and is charged to the voltage existing across resistor 10 minus that across resistor 13. This condenser is also controllably associated with the grid of tube 8 through condenser 16 and resistor 17. Condenser $C_2$ is connected in the anode circuit of tube 8 and is substantially discharged since this tube is carrying a small anode current. This is because the charging voltage obtained from resistor 10 is connected to condenser $C_2$ through resistor 20 which is of relatively high value so that the anode current of tube 8 flowing through this resistor produces a voltage drop which nearly equals the drop across resistor 10. A direct current source 9 indicated as a battery in Fig. 1 supplies the necessary anode and grid biasing voltages for tubes 7 and 8 of the delay circuit in cooperation with resistors 10, 11, 13, 14 and 15 and potentiometer 12. Potentiometer 12 adjusts the grid bias of tube 8 and consequently the time of delay as will be more clearly explained later. Tubes 7 and 8 are preferably of the gas-filled type and it will be evident that should the grid of tube 7 approach zero potential or become slightly positive, the anode circuit of this tube will rapidly discharge condenser $C_1$. Condenser 16 is connected between the anode of tube 7 and the grid of tube 8 and brings about close coupling of these tube elements. Resistor 17, connected in the grid circuit of tube 8, has a relatively high value and due to the grid current flow it tends to maintain a relatively low positive bias of said grid even though the potential at the junction between resistors 14 and 15 may reach a relatively high positive value. Resistor 19 connected in the anode circuit of tube 8 limits the discharge current from condenser $C_2$. Output transformer 18 inductively connects the delay circuit with the recording circuit by means of conductors 5, 5'.

A pulse synchronizing circuit suitable for studying the action of relay contacts is shown schematically in Fig. 2 wherein contacts 21 represent the contacts associated with the relay under study and are adjusted to open and close in a fixed time relationship with the particular relay contacts to be studied. In this connection it should be noted that if the study related to other phenomena the switching of contacts 21 would be controlled accordingly. For example, if heart action is being studied the cardiographic electromotive force may be amplified to operate a relay incorporating contacts 21, or if the study relates to the motion of a very light-weight mechanism an illuminating beam may be reflected upon a photoelectric cell to operate a relay incorporating contacts 21. A load, indicated by resistor 24, may be controlled by contacts 21. Battery 22 furnishes a suitable pulse energy source. Switch 23 is represented as a double pole reversing switch to permit the study of both opening and closing phenomena. Resistors 25 and condenser 26 act as a filter to supply to transformer 28 a somewhat rounded pulse, smoothing out contact chattering effects. Potentiometer 27 furnishes a means for controlling the pulse intensity. Amplifier 29 is shown diagrammatically with terminals 4, 4' as the amplifier output to the delay circuit 2 of Fig. 1. Any of the many known forms of amplifiers capable of transmitting a pulse would serve the purpose and if it contains a suitable output control, potentiometer 27 may be omitted.

Fig. 3 shows one form of sweep circuit which may be employed in the practice of this invention, a more complete description of which may be found by referring to an application filed February 25, 1936, by Frank R. Norton, Serial No. 65,607. The delayed pulse from delay circuit 2 enters this circuit by conductors 5, 5' and is applied to the grid of gas-filled tube 30, causing this tube to discharge the sweep condensers 37. A negative bias is maintained on the grid of tube 30 causing the plate current to cease as soon as condensers 37 are discharged. The recharging of these condensers begins at once and a substantially constant rate of charging is assured by the circuit arrangement of the pentode 31. Resistor 38 limits the discharge current from condensers 37. Resistors 34, 35 and 36, together with battery 33, furnish the plate and grid voltages. Condenser 39 and resistors 40 to 42, inclusive cooperate with pentode tube 31 to maintain a substantially constant charging rate for condensers 37 which are variable to afford sweep velocity adjustment. That is to say, the smaller the capacity of these condensers the more rapidly they will charge and the more rapid will be the sweep rate. Cathode ray tube 43 is shown schematically with its deflector plates, the sweep plates being shown connected across condensers 37. The other plates are connected across contacts 21' which are under observation and which open and close in fixed time relationship with the pulse contacts 21 of Fig. 2. In these figures, contacts 21' are shown closed while contacts 21 are open. For the sake of the description that follows they are so adjusted that the moment observed contacts 21' open, contacts 21 close thus starting a pulse for the sweep circuit. In Fig. 3 contacts 21' are shown controlling the current from battery 44 in a load circuit 45 containing some inductance. Although contacts 21 and 21' are here made to operate simultaneously, it should be kept in mind that they need not be so adjusted so long as there is maintained a fixed time relationship between the initiation of their respective operations. The limiting conditions would be that this fixed time relationship must not be an interval greater than the desired delay time in the event that the initiation of the surge precedes that of the starting pulse and must not be greater than the designed adjustable delay time in the event that the initation of the surge follows that of the starting pulse. In either event the interval should be fixed and not variable.

In the application of this invention to relay contact study, an ordinary oscillogram is first produced as shown in Fig. 4 which is a graphical representation of the voltage across relay contacts 21' while both opening and closing. This oscillogram may be obtained by adjusting the time delay to zero. In Fig. 4, V represents the steady state voltage across the contacts during open circuit and is equal to the voltage of battery 44. At point C contacts 21' are closed and it will be noted some chattering took place as evidenced by the unsteady portion C' of the oscillogram. At point O contacts 21' were opened and the voltage rose rather unsteadily to a peak value P and then rapidly came to the open circuit steady value V again. The unsteady portion A—B of the curve presents desirable subject-matter for more detailed investigation. This invention by providing a suitable carefully controlled synchronizing pulse delay mechanism, delays the motion of the sweep until point A is reached on the characteristic curve shown in Fig. 4. The time delay measured from the beginning of the opening of contacts 21' is the portion $T_1$ of Fig. 4.

The amount of pulse delay is controlled by adjusting potentiometer 12 which varies the bias of tube 8 and consequently the voltage to which condenser $C_1$ will have to be charged before the potential at the junction between resistors 14 and 15 becomes zero or slightly positive with respect to the cathode of tube 8. It will be seen that this is, therefore, a control of the time required to allow tube 8 to again become conductive and, since tube 8 became non-conductive substantially instantaneously with the entering of the pulse to transformer 6, it is also a control of the delay time. In this connection it might be noted that condenser $C_1$ if made variable would also be a means of delay time control and, if desired, could be used alone for that purpose or in combination with potentiometer 12.

To obtain the expanded oscillogram of the portion A—B of Fig. 4 potentiometer 12 is adjusted to give a delay of time $T_1$ and the sweep velocity is adjusted by adjusting variable condensers 37 to make the sweep time equal to $T_2$ as shown on Fig. 4. Upon opening contacts 21' contacts 21 close thereby initiating the pulse current which enters the delay circuit in somewhat rounded regular form. The grid of tube 7 is suddenly made positive by the pulse coming through transformer 6. Tube 7 is thereby rendered conductive and condenser $C_1$ is rapidly discharged. The discharge of condenser $C_1$ suddenly changes the slight positive bias of tube 8 to a strong negative bias. It will be seen that at this instant both condensers $C_1$ and $C_2$ are discharged and both start to recharge. The circuit constants are such as to cause condenser $C_2$ to charge more rapidly so as to be sure to attain a suitable discharge potential for operating the sweep circuit control apparatus. When the predetermined time interval has elapsed as controlled by the time required to return the grid of tube 8 to such value as to render tube 8 conductive, condenser $C_2$ discharges through its anode circuit. The pulse from the discharge of condenser $C_2$ is transmitted by transformer 18 to the grid of gas-filled tube 36 in Fig. 3 which grid becomes positive and renders said tube conductive. Condensers 37 are thereby discharged substantially instantaneously and their immediate recharge furnishes the sweep voltage for cathode ray tube 43. As previously mentioned, pentode tube 31 and its associated control circuits provide for a substantially constant charge rate for condensers 37 thereby rendering a linear voltage time characteristic for the sweep electrodes. The delayed pulse thus transmitted starts a sweep which functions for the adjusted time $T_2$ thereby expanding the portion A—B of Fig. 4 to distinctly disclose the characteristics between these points as shown in Fig. 5.

What is claimed is:

1. In a device for indicating any desired portion of a transient surge having a means for initiating an electrical pulse in a fixed time relationship with the commencement of said surge, delay means comprising two condensers the first of which is normally charged and the second of which is normally substantially discharged, means for discharging said first-named condenser simultaneously with the initiating of said pulse, charging means adapted to immediately recharge said condenser at a controlled time rate, means responsive to the discharge of said first-named condenser adapted to permit the charge of said second-named condenser at a controlled time rate and substantially simultaneously with the recharge of said first-named condenser, said last-named means also adapted to rapidly discharge said second-named condenser when a charge on said first-named condenser has reached a predetermined amount, an indicating means, and means responsive to the discharge of said second-named condenser adapted to start said indicating means in operation.

2. In a device for indicating any desired portion of a transient surge having a means for initiating an electrical pulse in a fixed time relationship with the commencement of said surge, adjustable delay means cooperating with said initiating means adapted to delay the transmission of said pulse for a predetermined and adjustable period of time, an indicating means having a sweep circuit as a part thereof adapted to receive said delayed pulse and to be thereby started in operation, and means for adjusting the sweep velocity produced by said sweep circuit.

3. In a device for indicating any desired portion of a transient surge having a means for initiating an electrical pulse in a fixed time relationship with the commencement of said surge, delay means cooperating with said initiating means adapted to delay the transmission of said pulse for a predetermined and adjustable period of time, an electron discharge device and a control grid circuit therefor, a potentiometer means connected in the control grid circuit of said electron discharge device for adjusting the delay time a predetermined amount, an indicating means having a sweep circuit as a part thereof adapted to receive said delayed pulse and to be thereby started in operation and means for adjusting the sweep velocity produced by said sweep circuit.

4. In a device for indicating any desired portion of a transient surge having a means for initiating an electrical pulse in a fixed time relationship with the commencement of said surge, delay means cooperating with said initiating means adapted to delay the transmission of said pulse for a predetermined and adjustable period of time, an electron discharge device and a control grid therefor, a variable capacity means associated with the control grid circuit of said electron discharge device for adjusting the delay time a predetermined amount, an indicating means having a sweep circuit as a part thereof adapted to receive said delayed pulse and to be thereby started in operation and means for adjusting the sweep velocity produced by said sweep circuit.

5. In a device for indicating any desired portion of a transient surge having a means for initiating an electrical pulse in a fixed time relationship with the commencement of said surge, delay means cooperating with said initiating means adapted to delay the transmission of said pulse for a predetermined and adjustable period of time, means for adjusting the delay time a predetermined amount, and an indicating means comprising a cathode ray tube having sweep deflector plates and means for adjusting the sweep velocity produced by said plates, said indicating means being adapted to receive said delayed pulse to start said sweep in motion.

EVERETT T. BURTON.